United States Patent [19]

Lilja et al.

[11] Patent Number: 5,764,224
[45] Date of Patent: Jun. 9, 1998

[54] CORDLESS MOUSE-STYLUS-POINTER

[75] Inventors: Patrik Lilja; Thomas D. Snyder, both of Raleigh, N.C.

[73] Assignee: Ericsson Inc., Research Triangle Park, N.C.

[21] Appl. No.: 816,963

[22] Filed: Mar. 25, 1997

[51] Int. Cl.$^6$ .................................................. G09G 5/00
[52] U.S. Cl. ............................ 345/179; 345/158; 345/163
[58] Field of Search .................................. 345/179, 163, 345/168, 169, 157, 158; 362/118

[56] References Cited

U.S. PATENT DOCUMENTS

| | | | |
|---|---|---|---|
| 4,787,051 | 11/1988 | Olson | 364/518 |
| 5,193,897 | 3/1993 | Halsey | 361/118 |
| 5,459,489 | 10/1995 | Redford | 345/179 |
| 5,495,269 | 2/1996 | Elrod et al. | 345/179 |
| 5,617,304 | 4/1997 | Huang | 362/118 |
| 5,663,828 | 9/1997 | Knowles et al. | 359/237 |

*Primary Examiner*—Jeffery A. Hofsass
*Assistant Examiner*—Ashok Mannava
*Attorney, Agent, or Firm*—Jenkens & Gilchrist, P.C.

[57] ABSTRACT

An apparatus providing combined mouse-stylus-pointer functionalities for interfacing with an electronic device is disclosed. The apparatus includes a body defining a chamber for containing electronic circuitry and a stylus member for mechanically actuating an electronic device. A light source projects a light beam out of the body for acting a light beam pointer. The circuitry within the body provides cordless mouse functionalities and pointer functionalities. The mouse circuitry drives a pointer on a display of the electronic device. The pointer functionalities controls the light source projecting the light beam. A user is able to select the various functionalities through an activation interface consisting of a button or other type of mechanical means.

18 Claims, 2 Drawing Sheets

CORDLESS MOUSE-STYLUS-POINTER

BACKGROUND OF THE INVENTION

1. Technical Field of the Invention

The present invention relates to user interfaces for electronic devices, and more particularly, to cordless devices providing a combination of functionalities within a single device such that the device may be used as a mouse, stylus and pointer.

2. Description of Related Art

The continued evolution of computer technology has provided users with a variety of devices for interacting with a computer. Two well known devices for enabling a user to interface with the computer include a mouse and a stylus. Mouse driven interactions allow a user to move either a connected or cordless mouse to position a pointer upon the display screen of their computer. In this manner, the user may open files, launch programs or perform a variety of data processing functionalities utilizing a simple point and click technique. A stylus enables a user to mechanically actuate a pressure sensitive computer display or electronic device. The stylus permits more direct interaction with a computer display and provides a manner for entering data or selecting information other than through a keyboard or mouse.

Computers may now operate in response to user input from both a mouse and a stylus. While this provides a great deal of flexibility to the user, the user is required to utilize a separate mouse controller and a separate stylus in order to interact with the computer using the two different types of interfaces. This can be very inconvenient for a user in situations where space may be limited, such as an individual working on a flight during a business trip.

Developments within the computer industry and the further expansion of lap-top and portable computer technology have also popularized the use of electronic presentations. These presentations involve the use of electronically generated slide shows which are projected onto a large screen and enables a presenter to provide a more professional presentation than is possible using more conventional techniques.

Use of electronic presentations may at times require the use of some type of pointing device to allow the presenter to better clarify a particular point within their presentation. This of course requires the presenter to have yet another apparatus, namely a pointer, to be used in conjunction with the stylus and mouse that may be required to operate the computer generating the electronic presentation. Therefore, some manner for simplifying the need for multiple devices to interact with a computer or to provide electronic presentations would be of great benefit.

SUMMARY OF THE INVENTION

The present invention overcomes the foregoing and other problems with an apparatus for interfacing with an electronic device that provides combined mouse, stylus and pointer functionalities in a cordless environment. The device includes a body defining an area for containing various electronic circuitry enabling the mouse and pointer functionalities. Extending from the body is a stylus member for mechanically actuating a pressure sensitive electronic display or electronic device. A light source consisting of an LED or laser is positioned to project a beam of light that acts as a pointing indicator for presentations and the like.

The circuitry within the body of the device provides for cordless mouse functionalities to a computer or electronic device. Using the cordless mouse functionalities, a pointer may be positioned on the screen of an electronic display. Pointer circuitry within the body also controls the light source to project a light beam as a pointing indicator. Selection between the mouse and pointer functionalities is provided with a user interface or switching control that enables the user to interactively select between operation of the device as a mouse or pointer.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
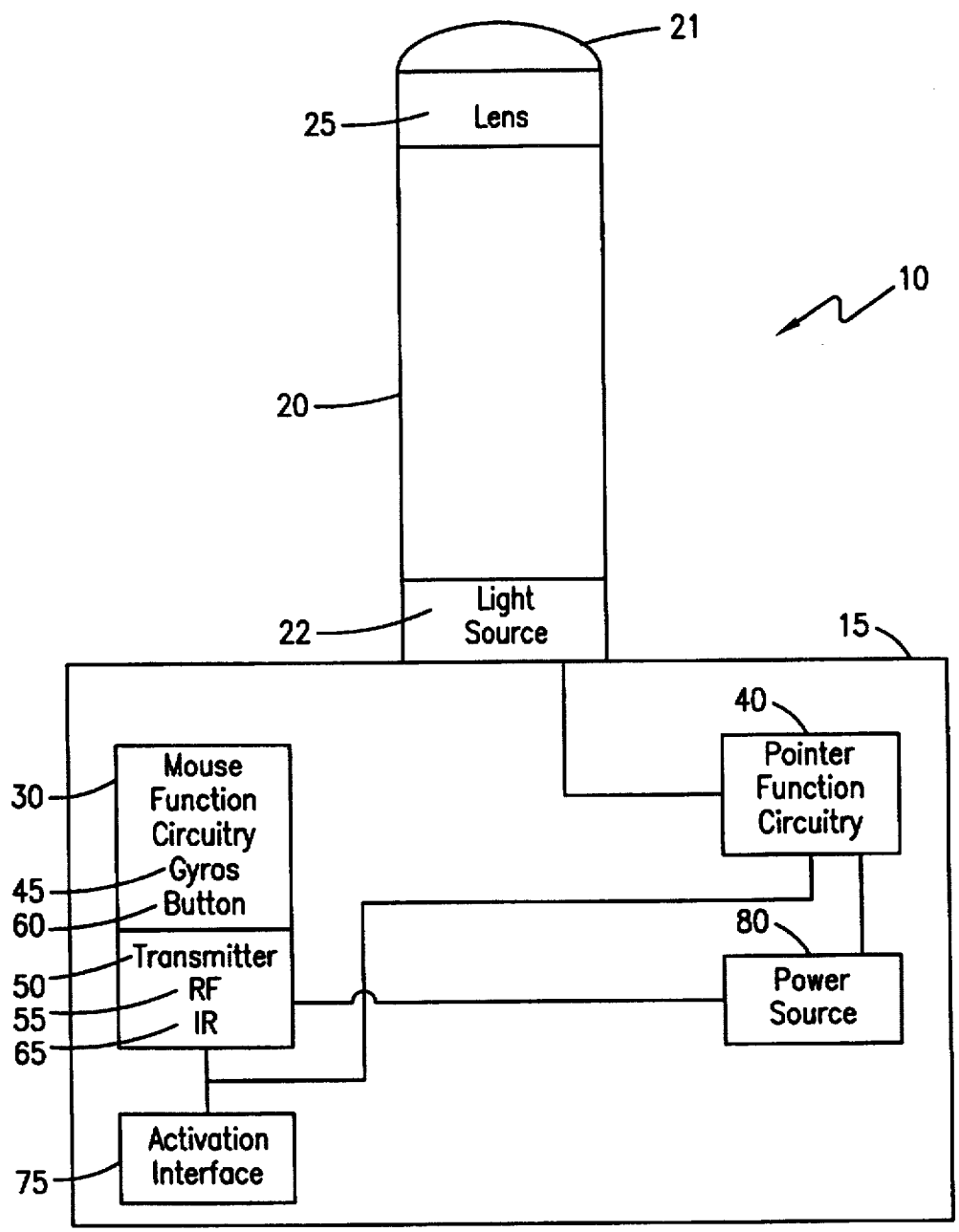
FIG. 1 is an illustration of a block diagram of a combination mouse-stylus-pointer of the present invention.

Referring now to the drawings, and more particularly to FIG. 1, there is illustrated the cordless mouse-stylus-pointer (MSP) device 10 of the present invention. The MSP 10 consists of a main body 15 enclosing the electronic circuitry of the device which will be more fully discussed in a moment.

Extending outward from the body 15 of the device 10 is a stylus member 20. The stylus member 20 includes a rounded end portion 21 for mechanically actuating pressure sensitive switches in a computer or associated display. The end portion 21 of the stylus member 20 must be sufficiently small and rounded such that the end is compatible with the resolution of an electronic screen with which it may interact. Alternatively, the stylus member 20 may act as a directional conduit for projecting an indicating beam when the device 10 is used as a pointer.

Included within the main body 15 is a light source 22 for projecting a beam of light from the main body to act as a pointing indicator. The light source consists of an LED, preferably of red color, or alternatively, may consist of a laser light. The light source 22 should provide a narrow viewing angle of no more than ±4 degrees. In order to achieve the necessary viewing angle, the addition of optical lenses 25 may be utilized within the main body 15. While FIG. 1 shows location of optical lenses 25 within the stylus member 20, the lenses may be located at any position within the main body 15 enabling easy projection of a light beam. A power source 80 within the body provides power to the light source and system functionalities.

The internal electronic circuitry within the body 15 provides circuitry for carrying out cordless mouse functionalities 30 and pointer functionalities 40. The mouse functionalities 30 provide cordless mouse capabilities that drive a pointer on the screen of an electronic device. The cordless functionality may be provided using a variety of technologies. In one embodiment, the mouse function circuitry 30 would consist of miniature gyros 45 or other types of motion sensing devices that generate motion data with respect to the MSP 10. The motion data is transmitted to the electronic device to drive the pointer via a transmitter 50 providing RF transmission capability 55.

In an alternative embodiment, the mouse function circuitry 30 would be interconnected with a mechanical device such as a button or track ball 60 that the user may manipulate in order to move a pointer on a display screen. Movement of the button 60 by a user generates movement data which is transmitted back to the electronic device through the transmitter 50 using for example IR scan codes 65. It should of course be realized that any combination of these or similar technologies may be utilized to generate the cordless mouse functionalities 30. For example, the use of resistive or capacitive pads on the MSP, VHF or high frequency audio signals for wireless transmission of information, etc. The only requirement is that the circuitry provide cordless mouse capabilities.

Figure 2:
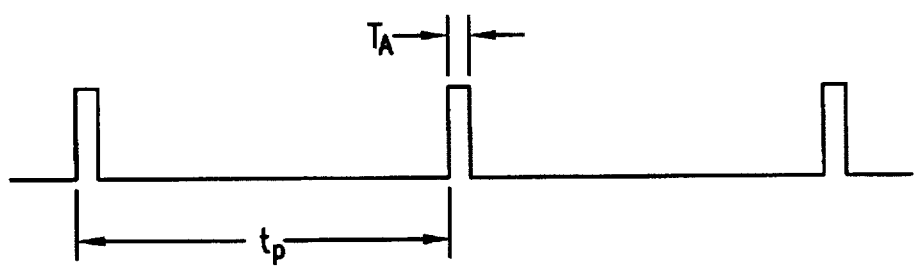
FIG. 2 is a timing diagram of a method for moving a mouse pointer utilizing an LED emitter from the MSP.

In yet another embodiment, the mouse function circuitry 30 may be implemented in a device using the pointer LED of the light source 22 as a mouse. In this embodiment, a light sensitive display is needed. To lengthen the battery life of the MSP 10 and make the light invisible, the LED is only lit during a short period of time, as illustrated in FIG. 2. The pulse time $T_p$ should be as long as possible without causing the pointer to be too slow as it moves across the display. A good estimation provides $T_p$ in the neighborhood of 10 milliseconds. The pulse active time TA (LED lit) should be as short as possible without losing connection with the display (approximately 10–100 microseconds).

The number of buttons pressed on the activation interface 75, which will be more discussed in a moment, may also be transmitted by the same LED that moves the pointer. The complexity of the protocol used to transmit the information is dependent upon the information needed to be sent. If only information on the button status codes must be transmitted, the data is synchronized with the pulse time described in FIG. 1. A three button protocol may be represented using three binary digits where 001 represents button 1, 010 represents button 2 and 100 represents button 3. Other protocols may be used for providing this information as necessary. The pointer functionalities 40 provide for the turning on and turning off of the light source to generate a light beam acting as a pointer.

Control between the various functionalities is provided by an activation interface 75. The activation interface 75 consists of some type of mechanical switch, lantern door, etc. providing means for switching on and/or between each of the various functionalities. One possible manner of activation includes software control activation in order to minimize the number of buttons or mechanical parts in the device. The software controlled device would comprise an MSP 10 with a single button acting as a mouse click button when quickly pressed. However, when the button is held down for an extended period of time and surpasses some threshold value, the light pointer would activate. In the case of the two or three button mouse, the pointer can be actuated by holding down some combination of mouse buttons simultaneously.

Figure 3:
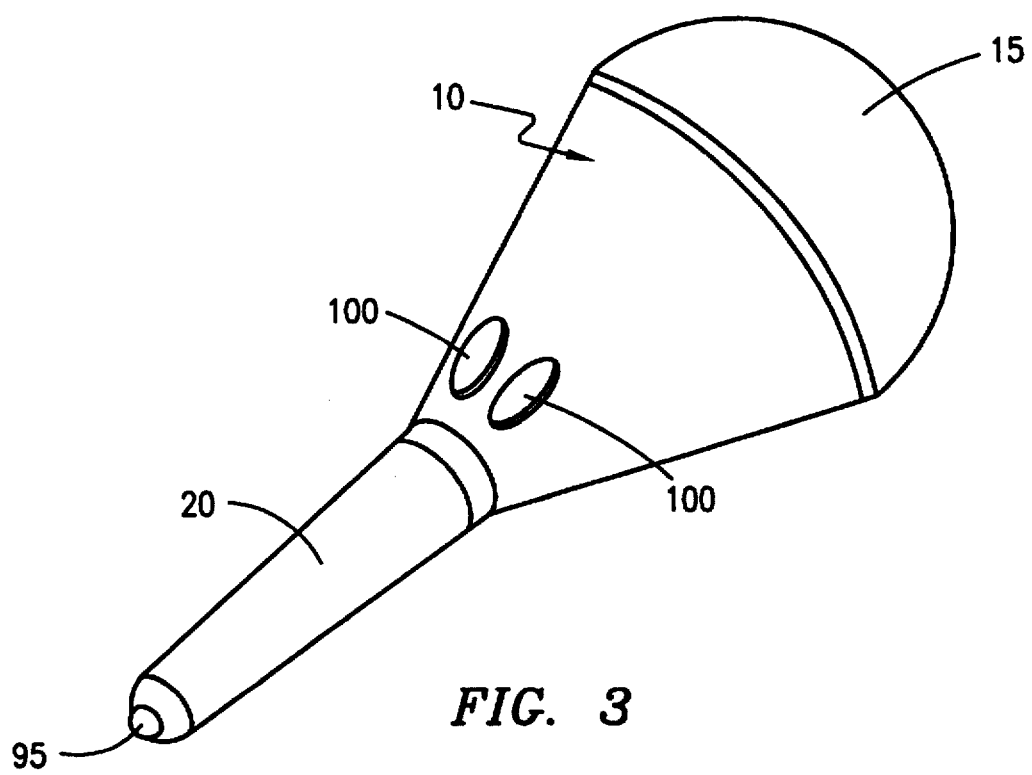
FIG. 3 is an illustration of one embodiment of the combination mouse-stylus-pointer.

Referring now to FIG. 3, there is illustrated one embodiment of the MSP 10 of the present invention. In FIG. 3, there is illustrated a MSP 10 having a rounded body 15 with the stylus member 20 extending therefrom. End 95 would provide a pointer indicator beam or touch point for interacting with a pressure sensitive electronic display. The control circuitry would be located within the interior of body portion 15 and a pair of user actuated switches 100 provide the activation interface 75 by the user.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. An apparatus for interfacing with an electronic device, comprising:

a body defining a location for containing electronic circuitry;

a stylus actuator for mechanically actuating the electronic device;

a light source;

mouse circuitry within the body for providing cordless mouse functionalities to the electronic device;

pointer circuitry within the body for controlling the light source to project a light beam to act as a pointer; and means for switching control of the apparatus between the mouse circuitry and the pointer circuitry.

2. The apparatus of claim 1 further including a power source for powering the light source, mouse circuitry and pointer circuitry.

3. The apparatus of claim 1 further including a lens for focusing radiated light from the light source.

4. The apparatus of claim 1 wherein the stylus actuator comprises a member extending from the body.

5. The apparatus of claim 4 wherein radiated light from the light source is directed along the member.

6. The apparatus of claim 1 wherein the mouse circuitry further comprises:

means for sensing motion of the body and generating motion signals indicative thereof; and means for transmitting the motion signals to the electronic device.

7. The apparatus of claim 1 wherein the mouse circuitry further comprises:

a mechanical manipulator;

means responsive to movement of the mechanical manipulator for generating a position signal; and means for transmitting the position signal to the electric device.

8. The apparatus of claim 1 wherein the light source comprises an LED.

9. The apparatus of claim 1 wherein the light source comprises a laser.

10. An apparatus for interfacing with an electronic device, comprising:

a body defining a location for containing electronic circuitry;

a stylus member extending from the body for mechanically actuating the electronic device;

a light source positioned within the body to direct a beam of light along the stylus member;

mouse circuitry within the body for providing cordless mouse control of the electronic device;

pointer circuitry within the body for controlling the light source to project a light beam for acting as a pointer indicator; and means for switching control of the apparatus between the mouse circuitry and pointer circuitry.

11. The apparatus of claim 10 further including a power source for powering the light source, mouse circuitry, pointer circuitry and stylus circuitry.

12. Apparatus of claim 10 further including a lens for focusing radiated light from the light source.

13. The apparatus of claim 10 wherein the mouse circuitry further comprises:

means for sensing motion of the body and generating motion signals indicative thereof; and means for transmitting the motion signals to the electronic device.

14. The apparatus of claim 10 wherein the mouse circuitry further comprises:

a mechanical manipulator;

means responsive to movement of the mechanical manipulator for generating a position signal; and means for transmitting the position signal to the electronic device.

15. The apparatus of claim 10 wherein the light source comprises an LED.

16. The apparatus of claim 10 wherein the light source comprises a laser.

17. An apparatus for interfacing with an electronic device, comprising:

a body defining a location for containing electronic circuitry;

mouse circuitry within the body for providing cordless mouse control of the electronic device;

a light source positioned within the body to direct a beam of light from the body; and pointer circuitry within the body for controlling the light source to project a beam of light for acting as a pointer indicator.

18. An apparatus for interfacing with an electronic device, comprising:

a body defining a location for containing electronic circuitry;

a light source positioned within the body to direct a beam of light out of the body;

mouse circuitry within the body for providing cordless mouse control of the electronic device;

pointer circuitry within the body for controlling the light source to project the beam of light to act as a pointer indicator; and means for switching control of the apparatus between the mouse circuitry and pointer circuitry.

* * * * *